United States Patent

Williams

[15] 3,641,430
[45] Feb. 8, 1972

[54] ELECTRICAL CONTACT TEST APPARATUS FOR TESTING THE BREECH, OR BREECH CAP OF A MILITARY AIRCRAFT EJECTION RACK

[72] Inventor: Robert A. Williams, Fort Worth, Tex.
[73] Assignee: Williams Instrument, Inc., Fort Worth, Tex.
[22] Filed: Mar. 12, 1970
[21] Appl. No.: 18,971

[52] U.S. Cl. ............................................................ 324/51
[51] Int. Cl. ....................................................... G01r 31/02
[58] Field of Search .............................................. 324/51, 53

[56] References Cited

UNITED STATES PATENTS 3,553,572  1/1971  Harmon ................................... 324/53

*Primary Examiner*—Gerard R. Strecker
*Attorney*—Wofford, Felsman and Fails

[57] ABSTRACT

Test apparatus especially suitable for testing the breech or breech cap used with ejection racks in military aircraft and including one pair of contacts for engaging the inner contact of the breech or breech cap and connected in a series with a power source and an indicator. A second set of contacts engages an outer contact and a breech or breech cap and is also connected in series with a power source and an indicator. A third indicator is connected in a series across one of the inner contacts and one of the outer contacts of the breech or breech cap. As a consequence, the electrical conductivity of the surfaces of inner and outer contacts of the breech or breech cap may be determined, as well as stray voltage across the inner and outer contacts.

1 Claims, 3 Drawing Figures

PATENTED FEB 8 1972
3,641,430
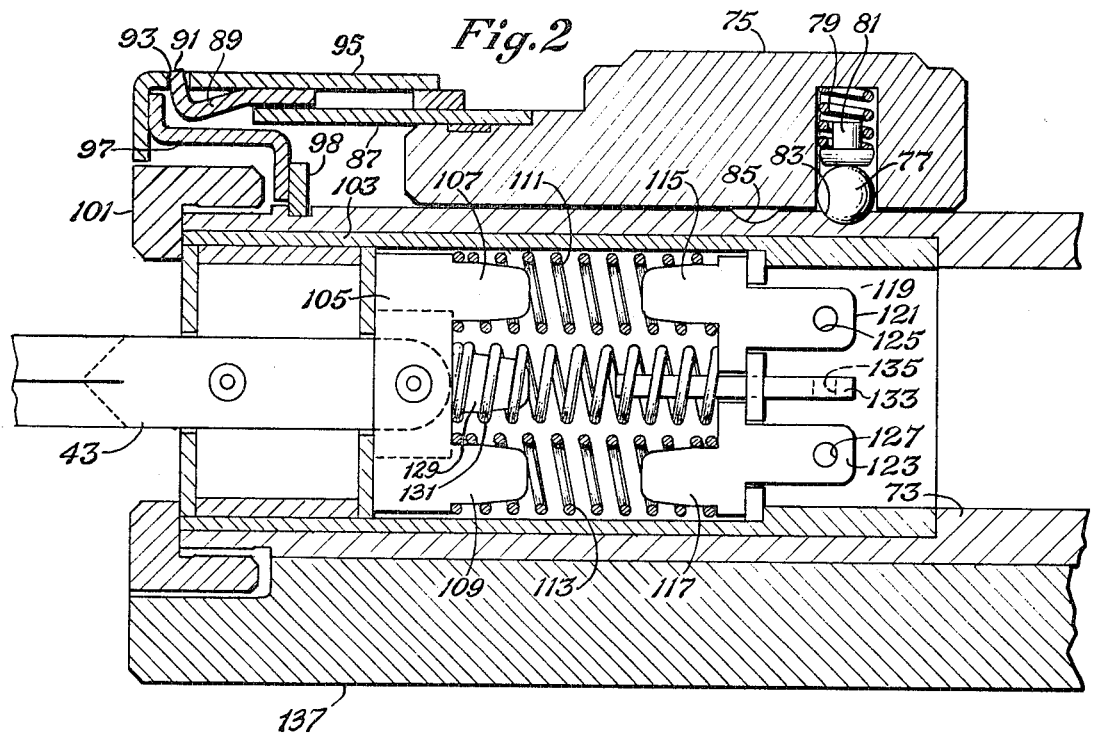
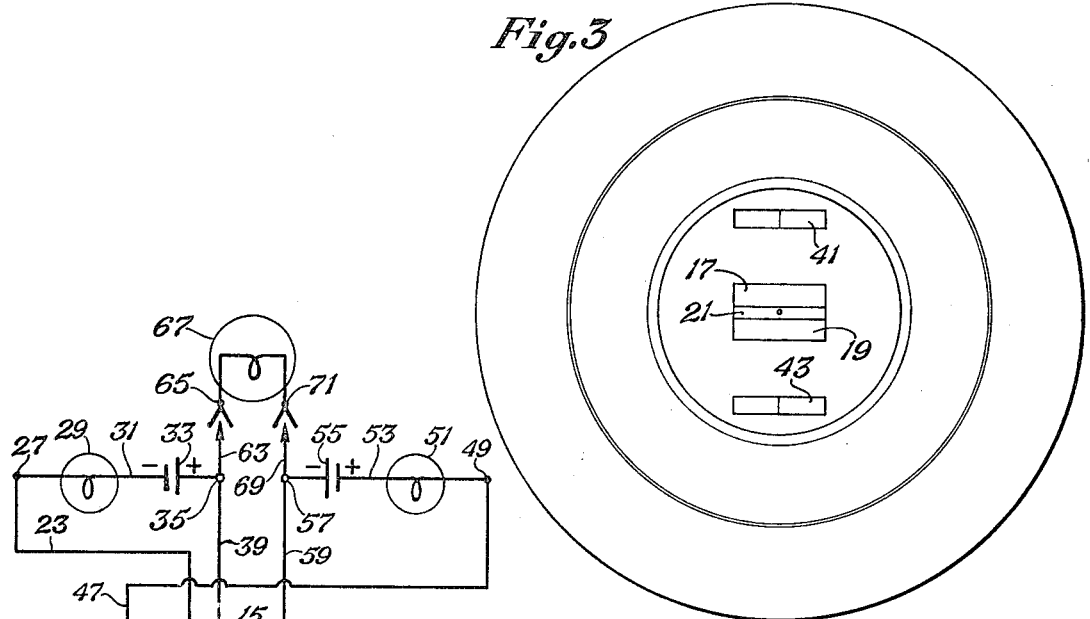
INVENTOR
Robert A. Williams
BY
Wofford & Felsman
ATTORNEYS

ELECTRICAL CONTACT TEST APPARATUS FOR TESTING THE BREECH, OR BREECH CAP OF A MILITARY AIRCRAFT EJECTION RACK

BACKGROUND AND GENERAL DESCRIPTION

It is common that modern, high-speed military aircraft utilize ejection racks in which explosives eject bombs, rockets or other missiles. Use of explosives for such ejections has well recognized advantages over utilizing gravity. It is common for the explosive used to discharge the missile to be detonated with an electrical firing system under the control of the pilot. Unfortunately, a large number of deaths have occurred when stray or spurious electrical energy occurs across the electrical contacts in ejection racks, causing premature detonation of the explosive used to discharge the missile. Moreover, should it be impossible to make electrical contact with the contacts in the breech or breech cap, detonation of the explosive used to eject the missile is prevented.

Previously, apparatus has been developed that may be utilized to test the breech or breech cap for the occurrence of spurious electrical energy. See for example my patent application entitled Pyrotechnic Detonator Circuit Test Probe, Ser. No. 756,085, filed Aug. 14, 1968, now U.S. Pat. No. 3,505,635. Such apparatus has the disadvantage, however, of not being useful to determine whether or not the electrical contacts in the breech or breech cap are electrically conductive. The products of combustion generated by the explosive in the cartridge may, after a certain number of missions, coat the electrical contacts in the breech or breech cap such that they do not transmit electrical energy to the explosive. What is needed is apparatus which will test those electrical contacts prior to each mission to determine that they are operational in a convenient and failsafe manner.

It is, therefore, the general object of my invention to provide improved electrical contact test apparatus that is especially useful in testing the breech or breech caps of ejection racks in military aircraft.

Another object of my invention is to combine electrical contact test apparatus which test both for spurious voltage across the contacts of the breech or breech cap in military aircraft ejection rack, and simultaneously, test the electrical contacts to determine that they are capable of conducting electrical energy to the explosive.

Another object of my invention is to provide a test probe structure or support means that carries first and second pairs of contacts adapted to engage the electrical contact in the breech or breech cap, said first and second pairs of contacts being resiliently mounted within the body of the test probe.

These and other objects of my invention will become apparent in the following detailed description.

BRIEF DESCRIPTION OF THE FIGURES OF THE DRAWING

FIG. 1 is a schematic view of electrical contact test apparatus employing the principles of my invention.

FIG. 2 is a cross-sectional view of test probe apparatus, the upper half of the view showing apparatus employing latch elements for securing the probe within the breech or breech cap, and the lower half of the view showing apparatus that is inserted into the breech or breech cap and held by hand.

FIG. 3 is an end view of the apparatus shown in FIG. 2.

DESCRIPTION OF PREFERRED EMBODIMENTS

The numeral 11 in FIG. 1 of the drawing designates an inner electrical contact of a breech or breech cap (not shown). Surrounding the inner contact 11 is an outer contact 13. Engaging the inner contact 11 is a first pair of contacts 15 that consist of a left contact 17 and a right contact 19 separated by insulating material 21.

An electrical conductor 23 is connected to a terminal 25 on left contact 17 and to a terminal 27 associated with an indicator 29, which may be in any suitable form such as a light, or meter for measuring current or voltage. Hereinafter, this indicator will be referred to as a first indicator. Another terminal 31 associated with the first indicator 29 is connected with a battery 33, or other suitable power source, the positive side of which is connected with a terminal 35. Extending between terminal 35 and a terminal 37 on the right electrical contact 19 is an electrical conductor 39.

A second pair of contacts, consisting of a left contact 41 and a right contact 43 engage the outer contact 13 in the breech or breech cap. Connected with a terminal 45 of the left contact 41 is electrical conductor 47 that extends to a terminal 49 associated with a second indicator 51 that may be of the same type as the first indicator 29.

Another terminal 53 of the indicator 51 is connected with a power source 55, that may be identical with the one 33 previously mentioned, the negative side of which is connected with a terminal 57. An electrical conductor 59 extends between terminal 57 and a terminal 61 associated with the right contact 43.

A conductor 63 extends between terminal 35 and a terminal 65 of a stray energy monitor, fuse, meter, or third indicator 67, while another electrical conductor 69 extends between a terminal 71 associated with the third indicator 67 and terminal 57.

Referring now to the upper half of FIG. 2, a tubular body 73 has reciprocally mounted on a movable sleeve 75 a radially movable ball 77 biased inwardly by the spring 79 and cap 81 to urge the ball into an annular groove 83 or another annular groove 85, which together define rear and forward positions of the movable sleeve. Extending forward from the movable sleeve is a cam surface 87, which in this form is a thin tubular member.

Latch elements 89 have their inner surface engaged by the cam surface 87, and is in effect a cam follower that supports a latch element 91 that protrudes from plural apertures 93 in a shell 95 that defines the outer periphery of the apparatus. The shell is supported by an annular bracket 97 and flange 98 secured to the body 73 as shown. An end abutment 101 is attached to the end of the body 73, and insulating material 103 separates the right and left contacts 43, 41 (see FIG. 3) of the second set of contacts shown in FIG. 3 from the right and left contacts 19, 17 that form the first set of contact. The outer contacts 43 extends rearward and is connected with a yolk 105 having protrusions 107, 109 connected respectively with electrically conductive second springs 111, 113 engaging protrusions 115, 117. Another yolk 119 has protrusions 121, 123 with apertures 125, 127 for securement to electrical conductors (not shown). Each inner contact 17 or 19 of the first set extends to a protrusion 129 associated with an electrically conductive first spring means 131 that extends rearward to a protrusion 133 having an aperture 135 for connection to a suitable electrical conductor. Hence, electrical energy may be supplied to or received from each of the second or first sets of contacts 41, 43 or 17, 19.

The lower half of the view of FIG. 2 shows test probe apparatus in which the body 73 is merely surrounded by an insulation sleeve 137 without latch elements so that the probe may be held in a breech or breech cap manually while testing for electrical conductivity or for spurious electrical energy.

In operation, and referring initially to FIG. 1, the first set of contacts 17, 19 and the second set of contacts 41, 43 are inserted into a breech or breech cap until they engage respectively the inner contact 11 and the outer contact 13. If the surface material engaged by the first set of contacts 17, 19 is electrically conductive, a circuit will be closed with the indicator 29 and the power source 33 to give a positive reading on the indicator. Similarly, if the surface material of the outer contact 13 is electrically conductive, the left and right contacts of the second set 41, 43 will close an electrical circuit between the power source 55 and the indicator 51.

Should spurious energy be present between the inner contact 11 and the outer contacts 13, as for example when there is a short circuit in the system, a circuit will be closed with the third indicator 67.

Hence, it is now possible to determine if both the inner contact 11 and the outer contact 13 are electrically conductive, and whether there is the presence of spurious electrical energy between the inner and outer contacts through utilization of one simple test.

The test probe apparatus previously described in connection with FIGS. 2 and 3 is advantageous in implementing the concept shown schematically in FIG. 1, since it is now possible to insert the test probe and latch it into place or merely hold the test probe manually while testing the apparatus.

While I have shown my invention in only a few of its forms, it should be apparent to those skilled in the art that it is not so limited but is susceptible to various changes and modifications without departing from the spirit thereof.

I claim:

1. Electrical contact test apparatus especially suitable for testing the breech or breech cap of military ejection rack cartridges, said apparatus comprising:
   a. a first pair of contacts carried by a support means and adapted to engage one electrical contact of said breech or breech cap;
   b. a first indicator connected in series with said first pair of contacts;
   c. a power source connected in series with said first indicator and said first pair of contacts;
   d. a second pair of contacts carried by said support means separate from said first pair of contacts and adapted to engage another electrical contact of said breech or breech cap;
   e. a second indicator connected in series with said second pair of contacts;
   f. a power source connected in series with said second indicator and said second pair of contacts;
   g. a third indicator connected to one of said contacts of said first pair of contacts and to one of said contacts of said second pair of contacts.

* * * * *